United States Patent
Park et al.

(10) Patent No.: US 9,414,408 B2
(45) Date of Patent: Aug. 9, 2016

(54) MULTI-RADIO CONTROLLER AND METHODS FOR PREVENTING INTERFERENCE BETWEEN CO-LOCATED TRANSCEIVERS

(71) Applicant: Intel Corporation, Santa Clara, CA (US)

(72) Inventors: Minyoung Park, Portland, OR (US); Jing Zhu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/940,220

(22) Filed: Nov. 13, 2015

(65) Prior Publication Data

US 2016/0135216 A1    May 12, 2016

Related U.S. Application Data

(63) Continuation of application No. 14/153,789, filed on Jan. 13, 2014, now Pat. No. 9,288,813, which is a continuation of application No. 12/346,453, filed on Dec. 30, 2008, now Pat. No. 8,630,272.

(51) Int. Cl.
| | |
|---|---|
| *H04W 72/12* | (2009.01) |
| *H04W 52/02* | (2009.01) |
| *H04W 72/04* | (2009.01) |
| *H04W 24/02* | (2009.01) |
| *H04W 88/06* | (2009.01) |

(52) U.S. Cl.
CPC .......... *H04W 72/1289* (2013.01); *H04W 24/02* (2013.01); *H04W 52/0235* (2013.01); *H04W 72/0446* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 7,978,667 B2 | 7/2011 | Kalhan et al. | |
| 8,630,272 B2 | 1/2014 | Park et al. | |
| 2007/0037548 A1* | 2/2007 | Sammour | H04W 52/0235 455/343.2 |
| 2007/0058605 A1* | 3/2007 | Meylan | H04W 72/0406 370/346 |
| 2007/0171933 A1 | 7/2007 | Sammour et al. | |
| 2007/0211677 A1 | 9/2007 | Laroia et al. | |
| 2007/0281617 A1 | 12/2007 | Meylan et al. | |
| 2007/0298742 A1* | 12/2007 | Ketchum | H04B 7/0617 455/186.1 |
| 2008/0101268 A1 | 5/2008 | Sammour et al. | |
| 2008/0232339 A1 | 9/2008 | Yang et al. | |

(Continued)

OTHER PUBLICATIONS

"U.S. Appl. No. 12/346,453, Response filed May 15, 2012 to Final Office Action mailed Feb. 15, 2012", 8 pgs.

(Continued)

*Primary Examiner* — Diane Lo
(74) *Attorney, Agent, or Firm* — Schwegman Lundberg & Woessner, P.A.

(57) ABSTRACT

Embodiments of a multi-radio controller and methods for preventing interference between co-located transceivers are generally described herein. In some embodiments, the multi-radio controller operates within a multi-radio device and is configured to cause a wireless local area network (WLAN) transceiver to transmit a triggering frame after an active period of a wireless wide-area network (WWAN) transceiver. The triggering frame indicates the duration of a transmission opportunity, which may be restricted to the time between active periods of the WWAN. In response to receipt of the triggering frame, the WLAN access point is configured to transmit a downlink data frame within the transmission opportunity.

20 Claims, 3 Drawing Sheets

(56) References Cited

U.S. PATENT DOCUMENTS

| | | |
|---|---|---|
| 2009/0061849 A1 | 3/2009 | Yang et al. |
| 2009/0181570 A1 | 7/2009 | Revelle, II |
| 2009/0252143 A1 | 10/2009 | Sridhara et al. |
| 2010/0029325 A1 | 2/2010 | Wang et al. |
| 2010/0040033 A1 | 2/2010 | Xhafa et al. |
| 2010/0165959 A1 | 7/2010 | Park et al. |
| 2014/0192788 A1 | 7/2014 | Park et al. |

OTHER PUBLICATIONS

"U.S. Appl. No. 12/346,453, Response filed Aug. 9, 2013 to Final Office Action mailed May 9, 2013", 13 pgs.

"U.S. Appl. No. 12/346,453, Final Office Action mailed Feb. 15, 2012", 24 pgs.

"U.S. Appl. No. 12/346,453, Final Office Action mailed May 9, 2013", 32 pgs.

"U.S. Appl. No. 12/346,453, Non Final Office Action mailed Aug. 10, 2011", 17 pgs.

"U.S. Appl. No. 12/346,453, Non Final Office Action mailed Dec. 20, 2012", 24 pgs.

"U.S. Appl. No. 12/346,453, Notice of Allowance mailed Sep. 6, 2013", 10 pgs.

"U.S. Appl. No. 12/346,453, Response filed Mar. 20, 2013 to Non Final Office Action mailed Dec. 20, 2012", 14 pgs.

"U.S. Appl. No. 12/346,453, Response filed Dec. 12, 2011 to Non Final Office Action mailed Aug. 10, 2011", 12 pgs.

"U.S. Appl. No. 14/153,789, Notice of Allowance mailed Jul. 24, 2015", 8 pgs.

"U.S. Appl. No. 14/153,789, Non Final Office Action mailed Jan. 9, 2015", 12 Pgs.

"U.S. Appl. No. 14/153,789, Response filed Apr. 8, 2015 to Non Final Office Action mailed Jan. 9, 2015", 11 pgs.

* cited by examiner

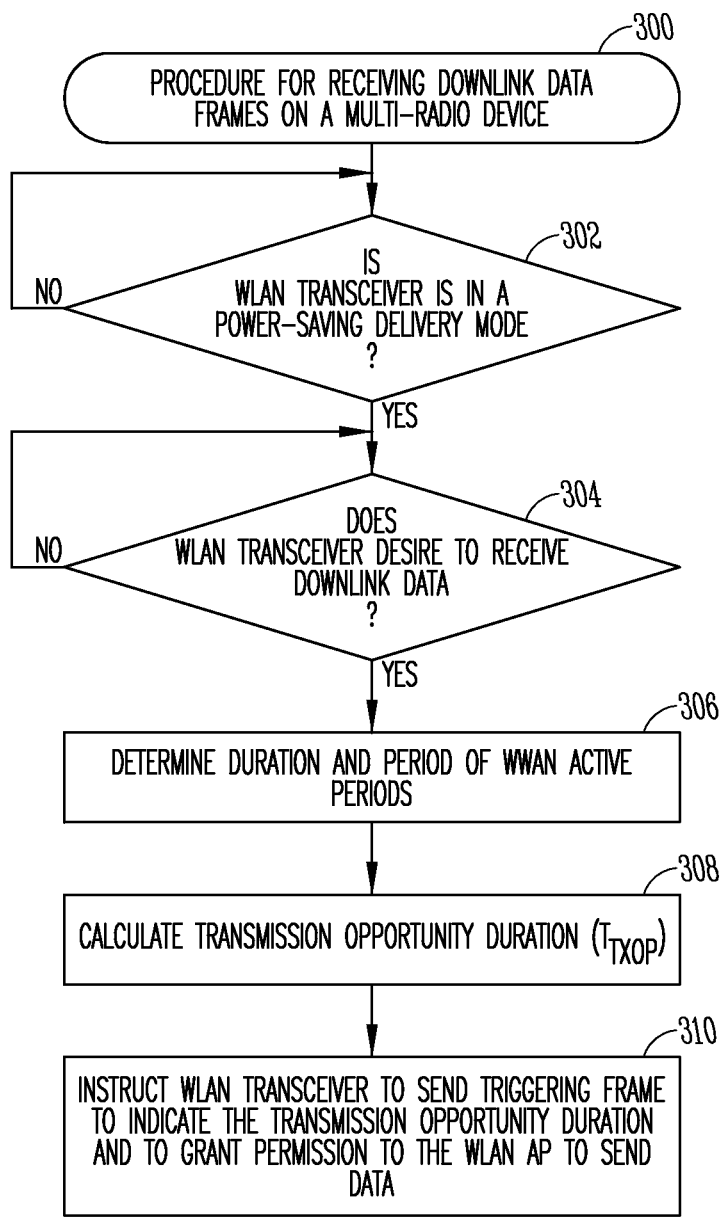

US 9,414,408 B2

MULTI-RADIO CONTROLLER AND METHODS FOR PREVENTING INTERFERENCE BETWEEN CO-LOCATED TRANSCEIVERS

This application is a continuation of U.S. patent application Ser. No. 14/153,789, filed Jan. 13, 2014, which is a continuation of U.S. patent application Ser. No. 12/346,453, filed on Dec. 30, 2008, now issued as U.S. Pat. No. 8,630,272, each of which is incorporated herein by reference in its entirety.

TECHNICAL FIELD

Some embodiments pertain to wireless communications. Some embodiments pertain to wireless devices that include more than one transceiver, such as a wireless wide area network (WWAN) transceiver and a wireless local area network (WLAN) transceiver. Some embodiments pertain to preventing interference between co-located radios on a multi-radio platform.

BACKGROUND

Many wireless devices today include more than one radio transceiver for communicating with more than one wireless network, such as a wireless wide area network and local area network. One issue with these multi-transceiver devices is that the communications of one transceiver may interfere with the communications of another transceiver.

Thus, there are general needs for multi-radio devices and methods that help reduce and/or eliminate conflicts between the co-located transceivers of a multi-radio device.

BRIEF DESCRIPTION OF THE DRAWINGS

FIG. 3 is a procedure for receiving downlink data frames on a multi-radio device in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

Figure 1:
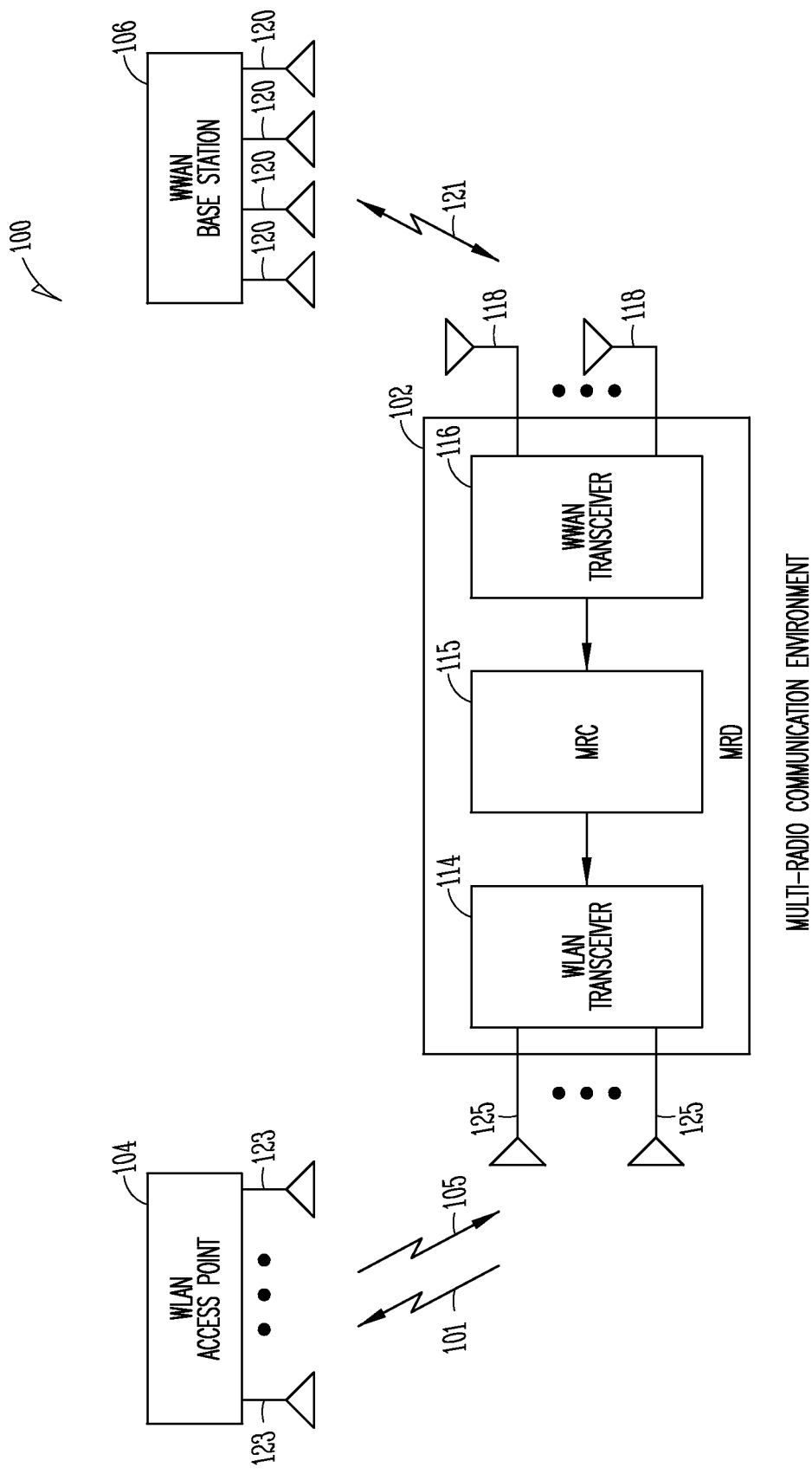
FIG. 1 illustrates a multi-radio communication environment including a multi-radio device (MRD) in accordance with some embodiments.

FIG. 1 illustrates a multi-radio communication environment including a multi-radio device (MRD) in accordance with some embodiments. Multi-radio communication environment 100 may include MRD 102, wireless local area network (WLAN) access point (AP) 104, and wireless wide-area network (WWAN) base station 106. MRD 102 may include co-located radio transceivers for communicating with both WLAN AP 104 and WWAN base station 106. In some embodiments, MRD 102 includes WLAN transceiver 114 for communicating with WLAN AP 104 and WWAN transceiver 116 for communicating with WWAN base station 106. MRD 102 may also include multi-radio controller (MRC) 115 to coordinate the activities of WLAN transceiver 114 and WWAN transceiver 116 to, among other things, mitigate and possibly prevent interference between the co-located transceivers 114 and 116. MRD 102 may include other functional elements not illustrated.

In some embodiments, WWAN transceiver 116 and WWAN base station 106 may communicate downlink and uplink subframes 121 during active periods. In these embodiments, MRC 115 may configure WLAN transceiver 114 and WLAN AP 104 to communicate between the active periods. In these embodiments, MRC 115 may cause WLAN transceiver 114 to transmit triggering frame 101 immediately after an active period of WWAN transceiver 116. Triggering frame 101 may indicate at least a duration of a transmission opportunity ($T_{TXOP}$). In response to receipt of the triggering frame, WLAN AP 104 may transmit downlink data frame 105 within the transmission opportunity. In these embodiments, the duration of the transmission opportunity may be set at triggering frame 101 to allow downlink data frame 105 to be received by WLAN transceiver 114 between the active periods of WWAN transceiver 116. These embodiments are discussed in more detail below.

In some embodiments, WLAN transceiver 114 may operate in a power-saving delivery mode and instruct WLAN access point 104 to refrain from transmitting downlink data frames to WLAN transceiver 114 unless requested by WLAN transceiver 114. WLAN transceiver 114 may also operate in accordance with a reverse direction (RD) protocol, and MRC 115 may cause WLAN transceiver 114 to set a bit in triggering frame 101 to indicate that WLAN transceiver 114 is granting permission to WLAN access point 104 to send data. These embodiments are discussed in more detail below.

MRD 102 may be almost any wireless communication device including both fixed communication stations as well as mobile communication devices. Examples of MRDs 102 may include a desktop, laptop or portable computer with wireless communication capability, a web tablet, a wireless or cellular telephone, an access point or other device that may receive and/or transmit information wirelessly. Although the various functional elements of MRD 102 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application-specific integrated circuits (ASICs), radio-frequency integrated circuits (RFICs) and combinations of various hardware and logic circuitry for performing at least the functions described herein. In some embodiments, the functional elements of MRD 102 may refer to one or more processes operating on one or more processing elements.

In some embodiments, WWAN transceiver 116, WLAN transceiver 114 and MRC 115 may be provided on a dual-mode wireless card for use in a laptop or personal computer. In some embodiments, WWAN transceiver 116, WLAN transceiver 114 and MRC 115 may be provided or fabricated on a single integrated circuit.

The term "WWAN" may refer to devices and networks that communicate using a broadband or wideband wireless access communication technique, such as orthogonal frequency division multiple access (OFDMA), that communicate during downlink and uplink subframes which may potentially interfere with the spectrum utilized by WLAN transceiver 114, including interference due to out-of-band (OOB) emissions. In some embodiments, WWAN transceiver 116 may be a Worldwide Interoperability for Microwave Access (WiMAX) transceiver, and WWAN base station 106 may be a WiMAX base station configured to communicate in accordance with at least some Electrical and Electronics Engineers (IEEE) 802.16 communication standards for wireless metropolitan area networks (WMANs) including variations and evolutions thereof, although the scope of the embodiments is not limited in this respect. For more information with respect to the IEEE 802.16 standards, please refer to "IEEE Standards for Information Technology—Telecommunications and Information Exchange between Systems" Metropolitan Area Networks—Specific Requirements—Part 16: "Air Interface for Fixed Broadband Wireless Access Systems," May 2005 and related amendments and versions thereof. In some other embodiments, WWAN transceiver 116 and WWAN base station 106 may communicate in accordance with at the 3rd Generation Partnership Project (3GPP) Universal Terrestrial Radio Access Network (UTRAN) Long Term Evolution (LTE) communication standards, Release 8, March 2008, including variations and evolutions thereof, although the scope of the embodiments is not limited in this respect.

WLAN transceiver 114 may be a wireless local area network or a Wireless Fidelity (WiFi) transceiver and may communicate with WLAN AP 104 in accordance with one or more of the IEEE 802.11-2007 and/or IEEE 802.11(n) standards and/or proposed specifications. For more information with respect to the IEEE 802.11 standards, please refer to "IEEE Standards for Information Technology—Telecommunications and Information Exchange between Systems"— Local Area Networks—Specific Requirements—Part 11 "Wireless LAN Medium Access Control (MAC) and Physical Layer (PHY), ISO/IEC 8802-11: 1999" and related amendments/versions.

The use of the terms WiFi, WLAN, WiMAX and LTE are not intended to restrict the embodiments to any of the requirements of the standards and specifications relevant to these technologies unless specifically claimed.

In some multiple-input, multiple-output (MIMO) embodiments, WWAN transceiver 116 may use two or more antennas 118 for communications, and WWAN base station 106 may use two or more antennas 120 for communications. In some MIMO embodiments, WLAN transceiver 114 may use two or more antennas 125, and WLAN AP 104 may use two or more antennas 123 for communicating. In these MIMO embodiments, the antennas of a single transceiver may be effectively separated from each other to take advantage of spatial diversity and the different channel characteristics that may result between the stations. The antennas may comprise one or more directional or omnidirectional antennas, including, for example, dipole antennas, monopole antennas, patch antennas, loop antennas, microstrip antennas or other types of antennas suitable for transmission of RF or microwave signals. In some embodiments, instead of two or more antennas, a single antenna with multiple apertures may be used. In these embodiments, each aperture may be considered a separate antenna. In some embodiments, the antennas of a transceiver may be separated by up to 1/10 of a wavelength or more.

In some WiMAX embodiments, WWAN base station 106 communicates with WWAN transceiver 116 within OFDMA downlink and uplink subframes 121 during and the active periods. In these embodiments, the downlink and uplink subframes are time-division multiplexed using the same set of frequency subcarriers.

In some LTE embodiments, WWAN base station 106 transmits to WWAN transceiver 116 using OFDMA downlink subframes, and WWAN transceiver 116 transmits to WWAN base station 106 using a single-carrier multiple access uplink. These communications may take place during active periods. The downlink subframes and the single-carrier multiple access uplink may comprise non-interfering frequency subcarriers.

Figure 2:
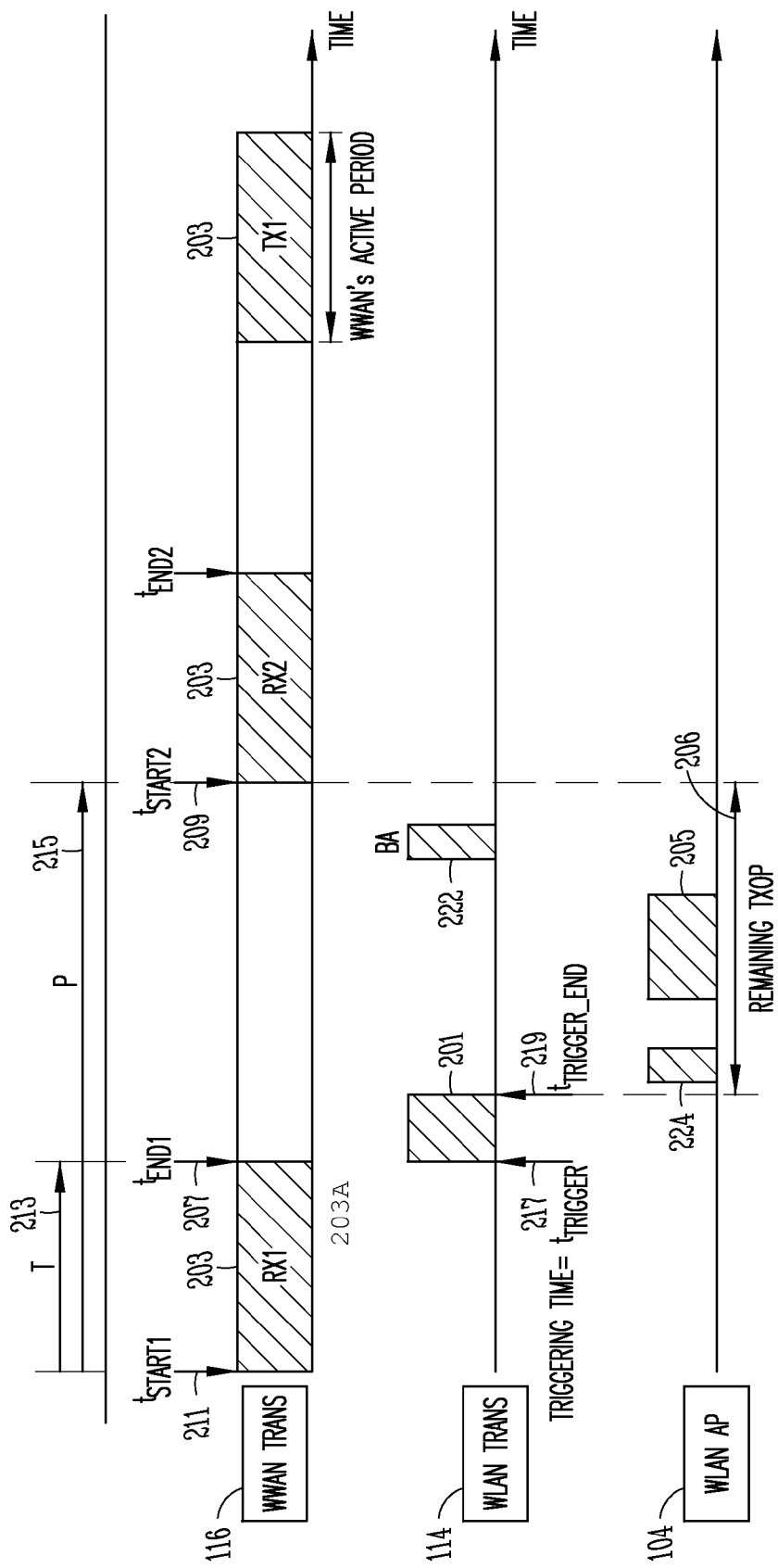
FIG. 2 illustrates communications in a multi-radio communication environment in accordance with some embodiments.

FIG. 2 illustrates communications in a multi-radio communication environment in accordance with some embodiments. WWAN transceiver 116 and WWAN base station 106 (FIG. 1) communicate during active periods 203. As illustrated in FIG. 2, WWAN transceiver 116 may receive during active periods 203 designated by RX1 and may transmit during active periods 203 designated by TX1. Active periods 203 may be periodic (e.g., regularly repeat) having active period duration 213 and an active interval period (P) 215. Active period duration 213 may be a burst length. As illustrated in FIG. 2, active period 203A has active period start time 211, active period duration 213, and end time 207.

In accordance with embodiments, to help mitigate interference with WWAN communications, MRC 115 (FIG. 1) is configured to cause WLAN transceiver 114 to transmit triggering frame 201 to WLAN AP 104 immediately after active period 203A. Triggering frame 201 may indicate at least duration 206 of a transmission opportunity ($T_{TXOP}$). In response to receipt of triggering frame 201, WLAN AP 104 may transmit downlink data frame 205 within the transmission opportunity. In these embodiments, duration 206 of the transmission opportunity is set at triggering frame 201 to allow downlink data frame 205 to be received between active periods 203.

In these embodiments, MRC 115 (FIG. 1) may determine duration 206 of the transmission opportunity based on a time between consecutive active periods 203 less the length of triggering frame 201. MRC 115 (FIG. 1) may also determine duration 206 of the transmission opportunity from active period duration 213 and active interval period 215. In these embodiments, the time between the consecutive active periods 203 may be the difference between end time 207 and start time 209 of two consecutive active periods 203.

In some embodiments, the duration 206 of the transmission opportunity ($t_{TXOP}$) may be determined in accordance with the following equation:

$$t_{TXOP} = \min(t_x - t_{TRIGGER\_END}, TXOP_{max}).$$

In this equation, TXOPmax indicates a maximum network transmit opportunity duration allowed by WLAN AP 104, $t_x$ may be any value in the range [$t_{TRIGGER\_END}$, $t_{START}$], $t_{START}$ may refer to triggering frame start time 217, and $t_{TRIGGER\_END}$ may refer to triggering frame end time 219.

In some embodiments, WLAN transceiver 114 may transmit triggering frame 201 when WLAN transceiver 114 is operating in a power-saving delivery mode and when WLAN transceiver 114 wishes to receive downlink data from WLAN AP 104. During the power-saving delivery mode, WLAN AP 104 may refrain from transmitting downlink data frames to WLAN transceiver 114 until downlink data is requested by WLAN transceiver 114. In these embodiments, WLAN transceiver 114 may inform WLAN AP 104 that it is entering a power-saving delivery mode by setting a power saving (PS) bit in a null frame, although the scope of the embodiments is not limited in this respect. In some embodiments, the power-saving delivery mode may be an unscheduled-automatic power saving delivery (U-APSD) mechanism in accordance with the IEEE 802.11(n) specifications referenced above, although the scope of the embodiments is not limited in this respect.

In some embodiments, WLAN transceiver 114 and WLAN AP 104 may operate in accordance with a reverse direction (RD) protocol. In these embodiments, MRC 115 (FIG. 1) may set a Reverse Direction Grant (RDG) "More PPDU" bit of a high-throughput control (HTC) field in a MAC frame (e.g., to one) to indicate that WLAN transceiver 114 is granting permission to WLAN AP 104 to send data. In these embodiments, the "More PPDU" bit may be set (e.g., to zero) in downlink data frame 205 transmitted by the WLAN AP 104 to indicate that no additional frames will be transmitted by WLAN AP 104. In some embodiments, the RD protocol may be in accordance with IEEE. 802.11(n) specifications referenced above, although the scope of the embodiments is not limited in this respect.

In these embodiments that operate in accordance with an RD protocol, once WLAN transceiver 114 has obtained a transmission opportunity, it may grant permission to WLAN AP 104 to send information back during the transmission opportunity. In some of these embodiments, the RD initiator (e.g., WLAN transceiver 114) may send permission to the RD responder (e.g., WLAN AP 104) using a RDG in the RDG/More PPDU bit of the HTC field in the MAC frame. In these embodiments, the "More PPDU" bit may be set to one in triggering frame 201 to indicate that it is granting permission to WLAN AP 104 to send data. In these embodiments, the "More PPDU" bit may be set to zero in downlink data frame 205 transmitted by WLAN AP 104 to indicate that no more frames will be transmitted by WLAN AP 104. Without the implementation of an RD protocol, the initiating station would have to capture and reserve time on a contention-based RF medium for each unidirectional data transfer, making it difficult to avoid conflicts with communications of the WWAN transceiver 116 during active periods 203.

Through a combination of a power-saving delivery mechanism, such as U-APSD, and an RD protocol, down-link traffic for a WLAN transceiver may be controlled to help assure that the WLAN transceiver operates between active periods 203 of a co-located WWAN transceiver, thus preventing potential interference between the WLAN and the WWAN.

In some embodiments, prior to transmission of downlink data frame 205, WLAN AP 104 may transmit a block-acknowledge (BA) 224 to acknowledge receipt of triggering frame 201. In this situation, the More PPDU bit may be set to indicate that an additional frame (i.e., downlink data frame 205) will follow BA 224. As illustrated in FIG. 2, WLAN transceiver 114 may transmit BA 222 to acknowledge receipt of downlink data frame 205. In these embodiments, by restricting the length of the transmission opportunity, downlink data frame 205, BA 224 and BA 222, including triggering frame 201, may fit within the time between active periods 203.

In some embodiments, triggering frame 201 may comprise either a data frame, such as a MAC layer Quality-of-Service (QOS) data frame, or a null frame, and downlink data frame 205 may comprise a QOS data frame, although the scope of the embodiments is not limited in this respect. In some embodiments, a duration/ID field of the MAC header of triggering frame 201, in accordance with the IEEE 802.11 specifications, may be used to indicate the duration of the transmit opportunity, although the scope of the embodiments is not limited in this respect.

In some embodiments, a method for receiving downlink data frames from a WLAN AP is provided. In these embodiments, MRC 115 (FIG. 1) may be configured to determine duration 213 and period 215 of active period 203 from co-located WWAN transceiver 116 and calculate duration 206 of a transmission opportunity. MRC 115 (FIG. 1) may also be configured to instruct WLAN transceiver 114 to transmit triggering frame 201 immediately after active period 203 and indicate duration 206 of the transmission opportunity within triggering frame 201. These embodiments are discussed in more detail below.

FIG. 3 is a procedure for receiving downlink data frames on a multi-radio device in accordance with some embodiments. Procedure 300 may be performed by a multi-radio controller of a wireless communication device that included co-located transceivers, such as WLAN transceiver 114 and WWAN transceiver 116.

In operation 302, the multi-radio controller determines whether or not the WLAN transceiver is in a power-saving delivery mode. When the WLAN transceiver is not in power-saving delivery mode, additional operations of procedure 300 are not performed and operation 302 is repeated until the WLAN transceiver enters a power-saving delivery mode. When the WLAN transceiver is in a power-saving delivery mode, operation 304 through 310 may be performed.

In operation 304, the multi-radio controller determines whether or not the WLAN transceiver desires to receive downlink data from the WLAN AP. When the WLAN transceiver desires to receive downlink data from the WLAN access point, operation 306 is performed. If the WLAN transceiver desires to receive downlink data from the WLAN access point, operation 306 may continue to be performed until the WLAN transceiver desires to receive downlink data from the WLAN access point.

In operation 306, the multi-radio controller determines the duration and period of WWAN active periods, such as active periods 203 (FIG. 2).

In operation 308, the multi-radio controller calculates a transmission opportunity duration, such as duration 206 (FIG. 1).

In operation 310, the multi-radio controller instructs the WLAN transceiver, such as WLAN transceiver 114, to send a triggering frame to indicate the transmission opportunity duration and to grant permission to the WLAN AP to send data. In these embodiments, the triggering frame may have the RDG "More PPDU" bit set to grant permission to send data.

Although the individual operations of procedure 300 are illustrated and described as separate operations, one or more of the individual operations may be performed concurrently, and nothing requires that the operations be performed in the order illustrated.

Unless specifically stated otherwise, terms such as "processing," "computing," "calculating," "determining," "displaying," or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments may be implemented in one or a combination of hardware, firmware and software. Embodiments may also be implemented as instructions stored on a computer-readable medium, which may be read and executed by at least one processor to perform the operations described herein. A computer-readable medium may include any tangible medium for storing or transmitting information in a form readable by a machine (e.g., a computer). For example, a computer-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a wireless communication device, the apparatus comprising:
   wireless local area network (WLAN) interface circuitry to communicate over a WLAN channel;
   cellular interface circuitry to communicate with cellular network and maintain an LTE connection with the cellular network; and
   controller circuitry, coupled to the WLAN interface circuitry and cellular interface circuitry, the controller circuitry to:
   determine a next traffic-free communication period associated with the LTE connection;
   during the next traffic-free communication period, obtain contention-free access to the WLAN channel in accordance with a transmission opportunity (TXOP) that extends up to an end of the next traffic-free communication period; and
   configure the WLAN interface circuitry to:
   generate a reverse direction grant (RDG) frame for transmission over the WLAN channel during the TXOP, the RDG frame including a RUG flag set to indicate that a reverse direction grant is provided; and
   receive a frame over the WLAN channel during the TXOP, in response to transmission of the RDG frame.

2. The apparatus of claim 1, wherein the controller circuitry is configured to determine a duration of the TXOP, the duration to extend from a contention phase to the end of the next traffic-free communication period.

3. The apparatus of claim 2, wherein the RDG frame includes a medium access control (MAC) header that includes a duration field to indicate a duration of the TXOP.

4. The apparatus of claim 3, wherein the controller circuitry is to configure the WLAN interface circuitry to receive frames over the WLAN channel during the TXOP, in accordance with a reverse direction protocol (RDP), and in response to transmission of the RDG frame.

5. The apparatus of claim 4, wherein a duration of the TXOP is determined based on an active period interval of the LTE connection, and
   wherein the WLAN interface circuitry is configured to obtain the TXOP during reception and transmission free periods of a time-division multiplexed (TDM) LTE connection.

6. The apparatus of claim 4 wherein the RDG flag comprises a RDG bit of a control field in the RDG frame.

7. The apparatus of claim 4 wherein the controller circuitry is arranged to configure the WLAN interface circuitry to operate in a power-saving delivery (PSI)) mode during an active period of the LTE connection.

8. The apparatus of claim 4 wherein the RDG frame is a trigger frame.

9. The apparatus of claim 4 wherein the WLAN interface circuitry comprises WLAN transceiver circuitry, and the cellular interface circuitry comprises cellular transceiver circuitry.

10. The apparatus of claim 9 further comprising one or more antennas coupled with the WLAN transceiver circuitry and the cellular transceiver circuitry.

11. An apparatus of user equipment (UE) comprising:
    memory and processing circuitry configured to:
    determine a next traffic-free communication period associated with an LIE connection;
    determine a duration for a transmission opportunity (TXOP) that extends up to an end of the next traffic-free communication period,
    during the next traffic-free communication period, obtain contention-free access to a WLAN channel in accordance with the duration of the TXOP;
    generate a reverse direction grant (RDG) frame for transmission over the WLAN channel during the TAM the RDG frame including a RDG flag set to indicate that a reverse direction grant is provided; and
    process a frame received over the WLAN channel during the TXOP, in response to transmission of the RDG frame.

12. The apparatus of claim 11, wherein the apparatus comprises a controller to interface with wireless local area network (WLAN) interface circuitry and cellular interface circuitry, the WLAN interface circuitry to communicate over the WLAN channel, the cellular interface circuitry to communicate with a cellular network and maintain the LTE connection with the cellular network.

13. The apparatus of claim 12, wherein the RDG frame includes a medium access control (MAC) header that includes a duration field to indicate a duration of the TXOP.

14. The apparatus of claim 13, wherein the controller is to configure the WLAN interface circuitry to receive frames over the WLAN channel during the TXOP, in accordance with a reverse direction protocol (RDP), and in response to transmission of the RDG frame.

15. The apparatus of claim 14, wherein a duration of the TXOP is determined based on an active period interval of the LTE connection, and
    wherein controller is to configure the WLAN interface circuitry to obtain the TXOP during reception and transmission free periods of a time-division multiplexed (TDM) LTE connection.

16. A non-transitory computer-readable storage medium that stores instructions for execution by processing circuitry of a wireless communication device to configure the device to perform operations to:
    determine a next traffic-free communication period associated with an LTE connection;
    during the next traffic-free communication period, obtain contention-free access to a WLAN channel in accordance with a transmission opportunity (TXOP) that is within the next traffic-free communication period;
    generate a reverse direction grant (RDG) frame for transmission over the WLAN channel during the TXOP, the RDG frame including a RDG flag set to indicate that a reverse direction grant is provided; and
    process a frame received over the WLAN channel during the TXOP, in response to transmission of the RUG frame.

17. The non-transitory computer-readable storage medium of claim 16, wherein the processing circuitry comprises a controller to interface with wireless local area network (WLAN) interface circuitry and cellular interface circuitry, the WLAN interface circuitry to communicate over the WLAN channel, the cellular interface circuitry to communicate with a cellular network and maintain the LTE connection with the cellular network.

18. The non-transitory computer-readable storage medium of claim 17, wherein the RDG frame includes a medium access control (MAC) header that includes a duration field to indicate a duration of the TXOP.

19. The non-transitory computer-readable storage medium of claim 18, wherein the controller is to configure the WLAN interface circuitry to receive frames over the WLAN channel during the TXOP, in accordance with a reverse direction protocol (RDP), and in response to transmission of the RDG frame.

20. The non-transitory computer-readable storage medium of claim 19, wherein a duration of the TXOP is determined to be within the next traffic-free communication period and the TXOP is configured to end prior to an end of the next traffic-free communication period.

* * * * *